United States Patent
Mori et al.

[11] Patent Number: 5,979,996
[45] Date of Patent: Nov. 9, 1999

[54] TRACTION CONTROL DEVICE FOR REAR-WHEEL DRIVE VEHICLE

[75] Inventors: Hisayoshi Mori; Norikata Goto; Nobushige Teraji, all of Hamakita, Japan

[73] Assignee: Nisshinbo Industries, Inc., Tokyo, Japan

[21] Appl. No.: 08/509,669

[22] Filed: Jul. 31, 1995

[30]     Foreign Application Priority Data

Aug. 2, 1994  [JP]  Japan .................................. 6-198964

[51] Int. Cl.$^6$ ............................................. B60T 15/12
[52] U.S. Cl. .................................. 303/113.2; 303/113.5; 303/9.71
[58] Field of Search .......................... 303/113.2, 113.5, 303/116.2, 116.1, 9.71, 9.62

[56]     References Cited

U.S. PATENT DOCUMENTS

| | | | |
|---|---|---|---|
| 4,824,183 | 4/1989 | Uchida et al. | 303/113.5 |
| 4,892,363 | 1/1990 | Burgdorf | 303/116.4 |
| 4,969,697 | 11/1990 | Lindenman | 303/113.5 |
| 5,021,957 | 6/1991 | Yoshino et al. | 303/113.5 |
| 5,188,435 | 2/1993 | Willmann | 303/113.2 |
| 5,236,256 | 8/1993 | Schmidt et al. | 303/113.5 |
| 5,244,262 | 9/1993 | Kehl et al. | 303/119.2 |

*Primary Examiner*—Matthew C. Graham
*Attorney, Agent, or Firm*—Nikaido, Marmelstein, Murray & Oram LLP

[57]     ABSTRACT

A traction control device is provided in which the valve opening pressure of the pressure relief valve is reduced to lower the hydraulic pressure generated by the pump. In this traction control device for a rear-wheel drive vehicle, the proportioning valve is positioned directly in front of the traction valve set in the main brake line that supplies pressure to the wheel cylinders of the rear wheels.

1 Claim, 3 Drawing Sheets

TRACTION VALVE SIDE         MASTER CYLINDER SIDE

TRACTION CONTROL DEVICE FOR REAR-WHEEL DRIVE VEHICLE

BACKGROUND OF THE INVENTION

This invention relates to a traction control device (TCS) that is used to prevent rear drive wheels from slipping during braking.

In a conventional rear-wheel traction control device, a proportioning valve (P-valve) is positioned between the rear wheel cylinder and inlet valve, in order to keep the brake pressure of the rear wheels lower than that of the front wheels, thereby stabilizing the vehicle.

A conventional rear-wheel traction control device as described presents the following problems.

1. During traction control, the hydraulic pressure discharged from the pump of the auxiliary hydraulic pressure device is routed through a proportioning valve (P-valve), thus lowering the pressure applied to the wheel cylinder. To compensate for this loss in pressure, the pump must increase the pressure that it discharges. This increases the valve opening pressure of the pressure relief valve, hastens wear-and-tear of the pump, increases the noise level of the motor driving the pump, and creates other problems.

2. Since the proportioning valve is positioned between the rear wheel cylinder and the inlet valve, one P-valve is required for each wheel. This increases space requirements as well as the cost of manufacturing.

SUMMARY AND OBJECTIVES OF THE INVENTION

The objective of this invention is to provide more efficient traction control during braking, in particular, to lower the valve opening pressure of the pressure relief valve.

A traction control device is provided in which the valve opening pressure of the pressure relief valve is reduced to lower the hydraulic pressure generated by the pump.

In this traction control device for a rear-wheel drive vehicle, the proportioning valve is positioned directly in front of the traction valve set in the main brake line that supplies pressure to the wheel cylinders of the rear wheels.

This invention provides the following advantages:

1. Since the proportioning valve (P-valve) is not positioned in the brake line used for traction control, hydraulic pressure is not attenuated anywhere along the line. Consequently, the life span of the pump is extended, and the noise from the pump motor during traction control is reduced.

2. A single proportioning valve (P-valve) can be used for both the left and right rear wheels, which makes the design more economical and saves space.

3. Since the proportioning valve (P-valve) is not positioned in the auxiliary hydraulic pressure line leading to the auxiliary hydraulic pressure device used for traction control, no constrictions are formed in the auxiliary line. Hence, a constant hydraulic pressure is supplied for accurate traction control.

DETAILED DESCRIPTION OF THE DRAWINGS AND OF THE PREFERRED EMBODIMENTS

The above and other objects and the attendant advantages of the present invention will become readily apparent by reference to the following detailed description when considered in conjunction with the accompanying drawings wherein.

DETAILED DESCRIPTION OF A PREFERRED EMBODIMENT OF THE INVENTION

Figure 1:
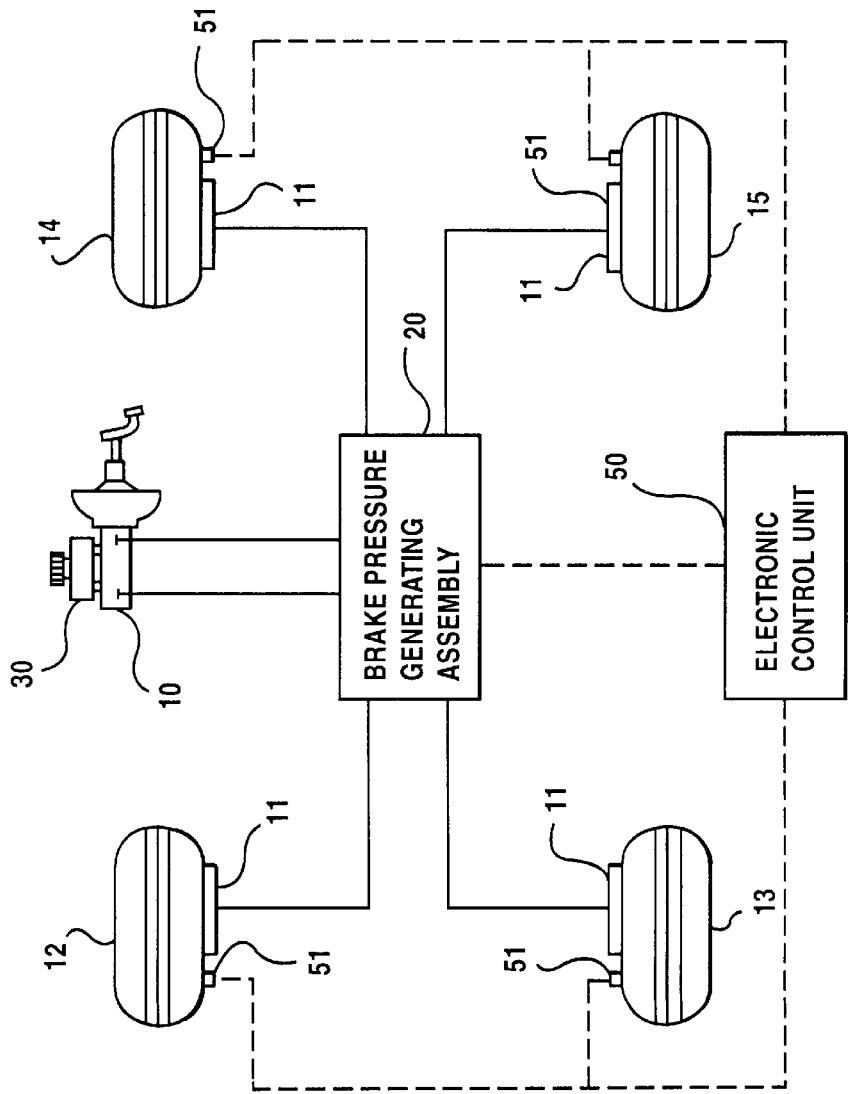
FIG. 1 is a conceptual diagram of the brake control device that controls the traction of a vehicle.
Figure 2:
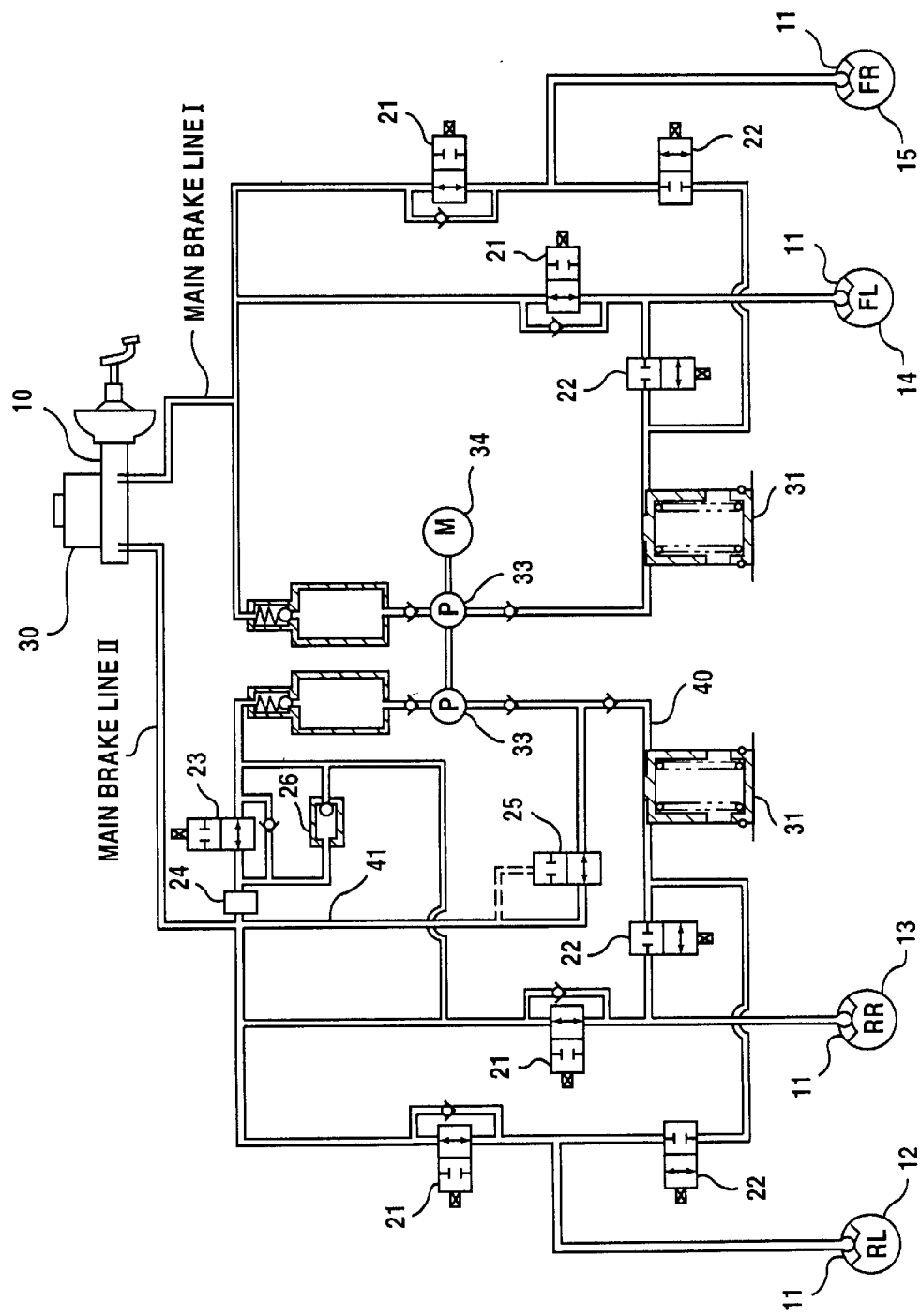
FIG. 2 is a hydraulic flow diagram of a brake control device that controls the traction of a rear-wheel drive vehicle.

An embodiment of this invention is explained below with reference to the attached diagrams.

A. Overview of Traction Control Device

This example illustrates one embodiment of this invention as applied to a rear-wheel drive car equipped with a traction control device (TCS). The hydraulic pressure generated from the brake pressure generating assembly 20 is applied to the wheel cylinders of the rear wheels 12, 13 to brake the vehicle. That is, if the rear wheels 12, 13, which are the drive wheels, start to slip, based on signals being transmitted from the wheel speed sensor 51, the electronic control unit 50 controls the traction of the rear wheels 12, 13 by means of the brake pressure generating assembly 20. Any customized hardware, microcomputer, or other general computer configuration can be used as the electronic control unit 50.

B. Configuration of Brake Lines

Two separate main brake lines I, II connect the wheel cylinder 11 of each wheel 12, 13, 14, 15 to the master cylinder 10 in a front-rear circuit. The main brake line I supplies brake pressure to the front wheels 14, 15, while main brake line II supplies brake pressure to the rear wheels 12, 13. An inlet valve 21, in other words a normally open solenoid valve, is installed for each wheel 12–15 in the respective brake lines, I, II.

The reflux line 40 is connected upstream of the inlet valve 21 in the respective main brake line. A normally closed outlet valve 22, auxiliary reservoir 31, and an auxiliary hydraulic pressure device, comprised of a hydraulic pump 33 and motor 34, are mounted in the reflux line.

In the main brake line II, a proportioning valve 24 and traction valve 23 are mounted upstream of the point of confluence of the main reservoir 30 and reflux line 40. A pressure relief valve 26 is aligned parallel to the traction valve 23, and the strength of the valve opening pressure determines the base pressure during traction control. An auxiliary hydraulic pressure line 41, branching off from the main rake line II from the main reservoir 30, is connected to the auxiliary hydraulic pressure device. The auxiliary line valve 25, mounted in the auxiliary hydraulic pressure line 41, supplies hydraulic pressure to the pump throughout traction control, and during normal braking or anti-skid control (ABS), the hydraulic pressure therein acts to block passage between the master cylinder and the pump.

The wheel speed sensor 51, which detects the rotational speed and rate of deceleration of the rear wheels, 12, 13, act in conjunction with the electronic control unit 50 to open and close the solenoid valves 21, 22, 23 during traction control. This valve action either reduces, maintains, or increases the pressure to the respective wheel cylinders 11 of the rear wheels 12, 13.

C. Proportioning Valve

Figure 3:
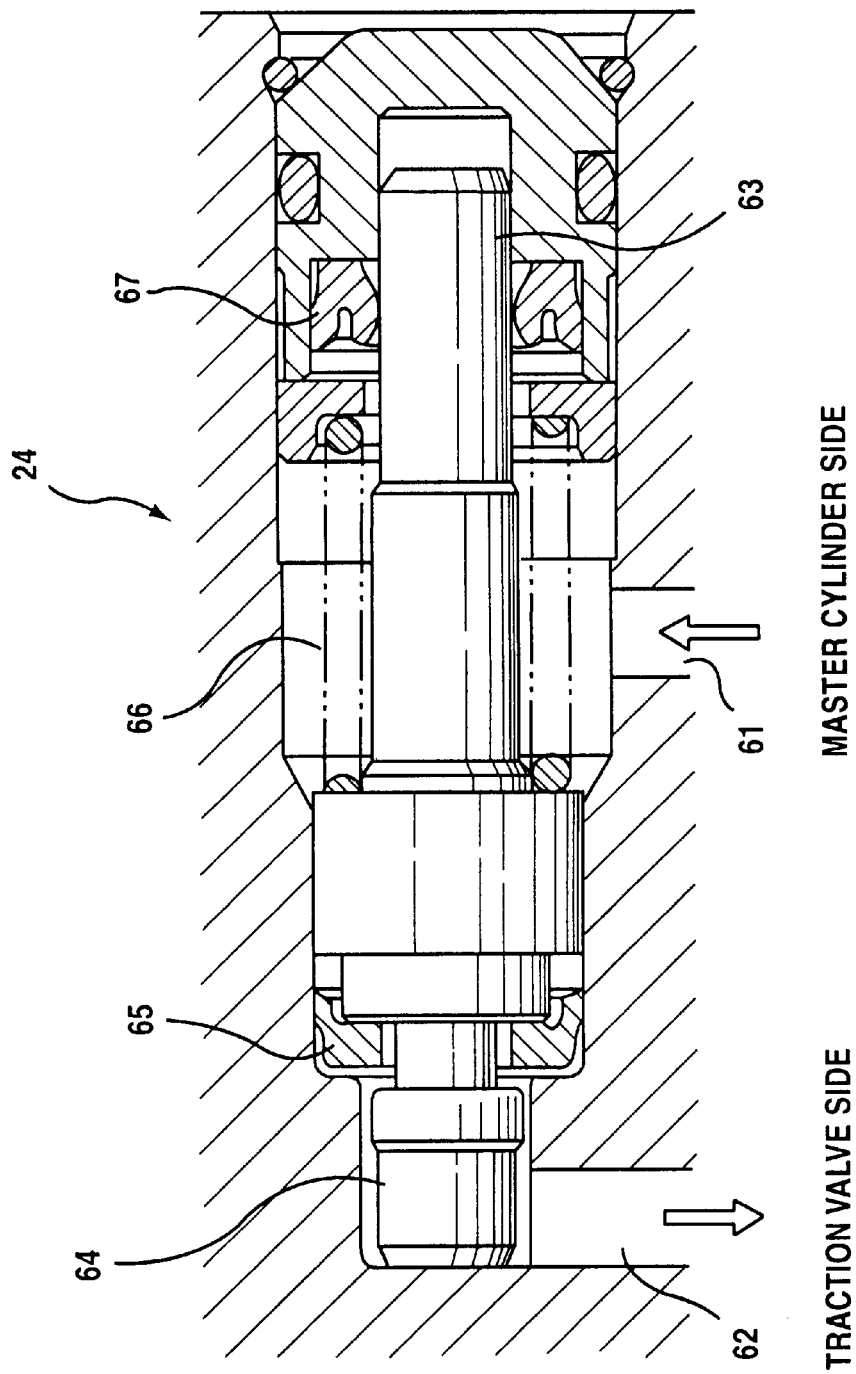
FIG. 3 illustrates the configuration of a proportioning valve.

As shown in FIG. 3, the proportioning valve 24 is configured from a brake fluid inlet 61 and brake fluid outlet 62, and an internal movable piston 63, energized by spring 66. If the input brake pressure at the inlet 61 from the master cylinder is low, the pressure passes unattenuated through the proportioning valve and is discharged from the outlet 62 on the traction valve side, wherein the input pressure is equal to the output pressure.

If the input pressure rises to a certain value, where the product of the cross section area of the seal lip 67 multiplied by the input pressure exceeds the spring force, then the piston 63 moves to the right (as manifested in FIG. 3). In doing so, the piston head makes contact with the seal 65, and blocks the brake line. Then as the input pressure increases further, the piston 63 moves to the left, opening the brake line, wherein the increased hydraulic pressure is transferred to the outlet 62 to increase the output pressure. As the output pressure increases further, the piston 63 once again moves to the right to block the brake line. This action maintains a constant proportion between the increase in the input pressure and the increase in the output pressure, and the input pressure becomes greater than the output pressure. Thus, the use of the proportioning valve 24 lowers the brake pressure of the rear wheels from that of the front wheels.

D. Operation

When the driver presses the brake pedal, in the main brake line I, the hydraulic pressure generated in the master cylinder 10 is supplied directly through the inlet valve 21 to the wheel cylinders of the front wheels 14, 15. In the main brake line II, hydraulic pressure is directed through the proportioning valve 24, traction valve 23, and inlet valve 21 to the wheel cylinders 11 of the rear wheels 12, 13. That is, by positioning the proportioning valve 24 in the main brake line II, the brake pressure is attenuated by the valve, thereby reducing the brake pressure of the rear wheels to be less than that of the front wheels in order to stabilize the vehicle. When the bake pedal is released, the brake fluid flows back to the master cylinder 10 by a reverse route.

If the rear wheels 12, 13, which are the drive wheels, start to spin excessively as the car accelerates from a stop, the traction valve 23 closes, and the auxiliary hydraulic pressure device is activated to generate hydraulic pressure from the pump 33, which is transmitted through the inlet valve and supplied to the wheel cylinders 11 of the rear wheels 12, 13. Since this pressure is not routed through the proportioning valve 24, it is applied without attenuation to the wheel cylinders 11. Accordingly, the hydraulic pressure generated by the pump 33 can be lower than if the pressure is supplied through the proportioning valve. The pressure is supplied to the rear wheel cylinders 11 through the repeated opening and closing of the inlet valve 21 and outlet valve 22 to the rear wheels 12, 13, thereby controlling the traction of the rear wheels.

It is readily apparent that the above-described has the advantage of wide commercial utility. It should be understood that the specific form of the invention hereinabove described is intended to be representative only, as certain modifications within the scope of these teachings will be apparent to those skilled in the art.

Accordingly, reference should be made to the following claims in determining the full scope of the invention.

We claim:

1. A traction control device for use with a rear-wheel drive vehicle comprising:

a traction valve and inlet valves mounted in a main brake line connecting wheel cylinders of rear wheels to a master cylinder;

an outlet valve, an auxiliary reservoir and an auxiliary hydraulic pressure device mounted in a reflux line connected to the main brake line between the wheel cylinder and at a point between the traction valve and the inlet valve;

an auxiliary hydraulic pressure line connecting a master cylinder and said auxiliary hydraulic pressure device;

a proportioning valve mounted in the main brake line upstream from the traction valve and downstream from a point of branching of the auxiliary line; and wherein during traction control, the traction valve is capable of closing thereby activating the auxiliary hydraulic pressure device to supply hydraulic pressure to the main brake line, and to open and close the inlet valve and the outlet valve in order to control the brake pressure to the wheel cylinders.

* * * * *